Patented Oct. 17, 1944

2,360,814

UNITED STATES PATENT OFFICE 2,360,814

DEALKYLATION OF POLYETHYL BENZENE

William J. Mattox, Chicago, Ill., assignor to Universal Oil Products Company, Chicago, Ill., a corporation of Delaware No Drawing. Application February 11, 1942, Serial No. 430,502

7 Claims. (Cl. 260—672)

This invention relates to a process for selectively removing one or more alkyl groups from polyalkylaromatic hydrocarbons to produce monoalkylaromatic hydrocarbons. More specifically it relates to a method for removing ethyl groups from polyethylbenzene such as diethylbenzene to produce monoethylbenzene.

Various processes have been used for producing ethylbenzene by the alkylation of benzene with ethylene or by the cyclization of aliphatic hydrocarbons containing at least 8 carbon atoms. During the course of the alklation reaction and cyclization of hydrocarbon fractions containing 10 or more carbon atoms per molecule, the desired monoethylbenzene is produced but there is also produced a substantial quantity of more highly alkylated ethylbenzenes such as diethylbenzene. My invention relates to a method for converting the polyethylbenzenes into the more valuable monoethylbenzene.

In one specific embodiment the present invention comprises treating polyethylbenzene such as diethylbenzene with an alumina or an alumina-containing catalyst in the presence of a hydrogen halide, preferably hydrogen chloride, at temperatures of the order of 450 to about 700° C.

Suitable catalysts comprise alumina produced by the controlled calcination of hydrated forms of aluminum oxide either naturally occurring or synthetic. The preferred catalyst comprises gamma alumina as the only form of aluminum oxide present. This may be produced by the controlled calcination of natural or synthetic hydrated aluminum oxides at temperatures above about 500° C. and preferably not in excess of 900° C. for a sufficient length of time to convert the hydrated oxide into the gamma form without leaving substantial amounts of the hydrated oxide and without converting any of the gamma alumina into the alpha form. If the latter condition occurs the catalyst will be substantially inert or at least of greatly reduced activity.

Naturally occurring minerals or earths containing alumina may also be used in the process although they are not necessarily equivalent to one another or to the synthetic forms of alumina. Bauxite which may be calcined to convert it into gamma alumina is a particularly good example of naturally occurring earth. Other aluminiferous clays may be used.

Naturally occurring aluminiferous earths may be used in the process after being treated chemically, for example, with mineral acids such as hydrochloric acids followed by washing to remove soluble salts. These materials are improved by calcination prior to use in the process.

Another type of clay which may be of considerable benefit comprises a synthetic mixture of silica and alumina prepared by the separate or simultaneous precipitation of hydrogels of the components from soluble compounds. These composites may be washed, dried, and calcined prior to use in the process.

The preferred hydrogen halide is hydrogen chloride although other hydrogen halides such as hydrogen bromide, hydrogen iodide and hydrogen fluoride may also be used. These are not necessarily exactly equivalent for my process.

The polyethylbenzene is contacted with the alumina at a temperature within the range of 450°–700° C. and preferably approximately 500–600° C.

The space velocity employed may vary up to about 20, depending on the catalyst and the temperature. Higher space velocities may be used with more active catalysts and for a given catalyst at higher temperatures. Normally an hourly liquid space velocity of about 0.2 to 5 is used when employing temperatures within the range of about 450–600° C. The space velocity as used herein is defined as the volumes of liquid charge per volume of catalyst per hour, the liquid being measured at room temperature.

The pressures employed may be subatmospheric, superatmospheric, or atmospheric. Good results may be obtained at pressures of atmospheric to about 100 pounds per square inch, although pressures above and below this limit may also be used depending on the temperature and space velocity.

To successfully carry out my invention it is necessary to correlate the conditions of temperature, pressure, and space velocity and this in turn depends to a certain extent upon the catalyst employed. Certain forms of the alumina or alumina-containing catalysts are more active than others and higher space velocities at a given temperature may be used.

The quantity of hydrogen halide employed may vary over a considerable range but normally at least 1 mol per cent is required. There is little benefit to be realized in using more than equimolar proportions of hydrocarbon and hydrogen halide. I do not, however, limit myself to this upper limit since it is possible to use higher ratios, even though in most cases there is no particular advantage in doing so.

The hydrogen halide may be separated and recycled to the process. It is not necessary to free the hydrogen halide completely of light hydrocarbon gases. However, it is necessary to remove substantial portions of ethylene before recycling the hydrogen halide to prevent buildup of this gas in the system.

The catalyst may be regenerated at intervals by burning it with an oxygen-containing gas to remove carbonaceous and hydrocarbonaceous deposits.

Since there is also some benzene and toluene formed in this process these must be separated from the ethyl benzene.

The unconverted polyethylbenzene may be returned for further conversion after the monoethylbenzene has been recovered.

The catalysts may be used in the form of granules or preformed particles or in the form of powders. The hydrocarbons undergoing treatment may be passed through beds of the alumina or alumina-containing catalyst, which may be contained in tubes or chambers. The reaction zone may or may not be externally heated. The catalyst may also be suspended in the hydrocarbon vapors in the form of a powder and passed through a heated reaction zone. In another modification the hydrocarbons and hydrogen halide may be contacted with fluidized powdered alumina. My invention is not limited to any particular apparatus or method of carrying out the contacting.

Under certain conditions and when using certain catalysts it may be desirable to add a relatively inert gas such as steam. This is of some utility, for example, when employing the synthetic silica-alumina type of catalyst.

I have found it advantageous to recycle a substantial portion of the liquid hydrocarbon fraction of reaction products boiling below ethylbenzene. By so doing, the yields of monoethylbenzene are substantially improved while at the same time the formation of lighter material is suppressed. It may be advantageous to recycle an amount of this light fraction so that there is 1 mol or more of it per mol of polyethylbenzene in the reaction zone. I find it advantageous to remove from the process only a small portion of the light fraction of aromatics formed as by-products in the process while recycling a major portion to the catalytic step. It is sometimes desirable to remove toluene from the light fraction, this being a valuable by-product.

The following example is given to illustrate the usefulness of the process but is not intended to limit it exactly to the conditions given therein.

Diethylbenzene was contacted with a catalyst comprising activated alumina of commerce which had been calcined at 550° C. to convert it into gamma alumina. Equimolar portions of diethylbenzene and hydrogen chloride were passed over the catalyst at temperatures of 550 and 600° C. respectively. At 550° C. the yield of monoethylbenzene on a once-through basis was 37 per cent. At 600° C. the once-through yield was 39 per cent.

When contacting diethylbenzene with alumina in the absence of hydrogen chloride no monoethylbenzene was formed.

By recycling the material boiling below monoethylbenzene together with the unconverted diethylbenzene it was possible to increase the yield of monoethylbenzene substantially. The ultimate yield obtainable by this method of operation at 550° C. was about 69 per cent and at 600° C. was about 78 per cent. This compares with a recycle yield of 50 per cent and 58 per cent of monoethylbenzene respectively when recycling only the diethylbenzene.

The results are summarized in the following table:

| | | |
|---|---|---|
| Temperature, °C | 550 | 600 |
| Run No | 1 | 2 |
| Yields, wt. per cent of charge: | | |
| Total liquid H. C | 83.0 | 86.6 |
| Gas | 15.3 | 11.9 |
| Carbon | 1.7 | 1.5 |
| Ethylbenzene | 37 | 39 |
| Diethylbenzene | 26 | 33 |
| Benzene | 10 | 10 |
| Intermediate fractions | 9 | 4 |
| Residue | 1 | <1 |
| Ethylbenzene yield, wt. per cent of diethylbenzene decomposed | 50 | 58 |
| Analysis of gas, mol. per cent: | | |
| Hydrogen | 45.3 | 22.2 |
| Methane | 14.7 | 7.6 |
| Ethylene | 22.6 | 48.6 |
| Ethane | 10.3 | 16.1 |
| $C_3$ and higher | 7.1 | 5.5 |
| Yields with recycle of the fraction boiling below monoethyl benzene | 69 | 78 |

I claim as my invention:

1. A process for the manufacture of monoalkylaromatic hydrocarbons from polyalkylaromatic hydrocarbons which comprises contacting said polyalkylaromatic hydrocarbons with a catalyst comprising alumina and a hydrogen halide under dealkylating conditions of temperature, pressure, and time.

2. A process for converting polyalkylaromatic hydrocarbons into monoalkylaromatic hydrocarbons which comprises treating said polyalkylaromatic hydrocarbons with an alumina-containing catalyst and a hydrogen halide under conversion conditions of temperature, pressure, and time, separating and recovering the monoalkylaromatic hydrocarbons formed and returning at least a portion of the reaction products boiling below the monoalkylaromatic hydrocarbons to the reaction zone.

3. A process for converting polyethylbenzene to monoethylbenzene which comprises treating said polyethylbenzene with an alumina catalyst and a hydrogen halide under conversion conditions of temperature, pressure, and time.

4. A process for converting polyethylbenzene comprising diethylbenzene into monoethylbenzene which comprises treating said polyethylbenzene with an alumina catalyst and hydrogen chloride under conversion conditions of time, temperature, and pressure, recovering the resultant monoethybenzene, and recycling unconverted polyethyl benzene together with at least a portion of the reaction product boiling below monoethylbenzene.

5. A process for converting diethylbenzene into monoethylbenzene which comprises treating said diethylbenzene in the presence of an alumina-containing catalyst and at least one mol per cent of a hydrogen halide at a temperature of from approximately 450 to approximately 700° C.

6. The process of claim 4 where at least one mol of the low-boiling reaction product is recycled per mol of polyethylbenzene in the reaction zone.

7. The process of claim 3 further characterized in that said hydrogen halide comprises hydrogen chloride.

WILLIAM J. MATTOX.